(12) United States Patent  
Senatori

(10) Patent No.: US 9,500,013 B2
(45) Date of Patent: Nov. 22, 2016

(54) HINGE ASSEMBLY FOR A COMPUTING DEVICE

(71) Applicant: HEWLETT-PACKARD DEVELOPMENT COMPANY, L.P., Houston, TX (US)

(72) Inventor: Mark David Senatori, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/786,337

(22) PCT Filed: Jul. 25, 2013

(86) PCT No.: PCT/US2013/051952
§ 371 (c)(1),
(2) Date: Oct. 22, 2015

(87) PCT Pub. No.: WO2015/012830
PCT Pub. Date: Jan. 29, 2015

(65) Prior Publication Data
US 2016/0123054 A1 May 5, 2016

(51) Int. Cl.
*E05D 3/18* (2006.01)
*G06F 1/16* (2006.01)
(Continued)

(52) U.S. Cl.
CPC . *E05D 3/18* (2013.01); *E05D 3/12* (2013.01); *E05D 11/081* (2013.01); *G06F 1/1618* (2013.01); *G06F 1/1681* (2013.01)

(58) Field of Classification Search
CPC ............. E05D 3/18; E05D 3/12; E05D 3/10; E05D 3/06; E05D 11/081; G06F 1/1616; G06F 1/1618; G06F 1/1681; E05Y 2900/606; H04M 1/0216; H04M 1/0222; H04M 1/022; H05K 5/0226
See application file for complete search history.

(56) References Cited

U.S. PATENT DOCUMENTS 4,840,288 A 6/1989 Lunderman et al.
5,325,984 A 7/1994 Ady et al.
(Continued)

FOREIGN PATENT DOCUMENTS

JP 2005-076666 3/2005
JP 2007-198416 8/2007
(Continued)

OTHER PUBLICATIONS

Purewal. S J; "Lenovo Thinkpad Twist Review: a Great Business Tool"; Dec. 10, 2012; 12 pages.

*Primary Examiner* — Courtney Smith
*Assistant Examiner* — Christopher L Augustin
(74) *Attorney, Agent, or Firm* — HP Inc. Patent Department

(57) ABSTRACT

Examples disclosed herein provide a hinge assembly for a computing device. The hinge assembly includes a first barrel coupled to a second barrel. The first barrel has a first groove that extends circumferentially and longitudinally along at least a length of the first barrel, and the second barrel has a second groove that extends circumferentially and longitudinally along at least a length of the second barrel. The hinge assembly includes a first hinge pivot shaft that rotates about a first axis via the first barrel, and the first shaft includes a first guide pin to follow the first groove along the first barrel. The hinge assembly includes a second hinge pivot shaft that rotates about a second axis via the second barrel, and the second shaft includes a second guide pin to follow the second groove along the second barrel. The hinge assembly includes a bracket that aligns a point along a length of the first shaft with a point along a length of the second shaft.

15 Claims, 5 Drawing Sheets

(51) Int. Cl.
*E05D 3/12* (2006.01)
*E05D 11/08* (2006.01)

(56) References Cited

U.S. PATENT DOCUMENTS

| | | | |
|---|---|---|---|
| 6,529,370 B1* | 3/2003 | Kamishima | G06F 1/1666 200/5 A |
| 7,027,294 B2 | 4/2006 | Kato | |
| 7,140,074 B2* | 11/2006 | Han | G06F 1/1681 16/336 |
| 7,353,050 B2 | 4/2008 | Im et al. | |
| 7,373,186 B2 | 5/2008 | Watanabe et al. | |
| 7,484,271 B2 | 2/2009 | Oshima et al. | |
| 7,512,426 B2* | 3/2009 | Maatta | H04M 1/0218 16/354 |
| 7,515,707 B2* | 4/2009 | Ka | G06F 1/1616 16/366 |
| 7,738,930 B2 | 6/2010 | Petrella | |
| 7,913,356 B2* | 3/2011 | Duan | H04M 1/0216 16/303 |
| 8,451,601 B2 | 5/2013 | Bohn et al. | |
| 2006/0112516 A1* | 6/2006 | Chen | G06F 1/1681 16/330 |
| 2006/0238968 A1 | 10/2006 | Maatta et al. | |
| 2009/0007380 A1* | 1/2009 | Feng | H04M 1/0216 16/305 |
| 2009/0282650 A1* | 11/2009 | Jin | H04M 1/0212 16/367 |
| 2010/0251518 A1* | 10/2010 | Chiang | G06F 1/1681 16/277 |
| 2011/0265288 A1 | 11/2011 | Chiang | |
| 2011/0289726 A1* | 12/2011 | Zhang | G06F 1/1681 16/250 |
| 2012/0192381 A1* | 8/2012 | Zhang | G06F 1/1681 16/366 |
| 2012/0309470 A1* | 12/2012 | Park | G06F 1/1681 455/575.3 |
| 2013/0016489 A1* | 1/2013 | Yeh | G06F 1/1681 361/807 |
| 2013/0111704 A1* | 5/2013 | Mitsui | H04M 1/022 16/250 |
| 2013/0152342 A1* | 6/2013 | Ahn | F16C 11/04 16/354 |
| 2013/0318746 A1* | 12/2013 | Kuramochi | G06F 1/1681 16/342 |

FOREIGN PATENT DOCUMENTS

| | | |
|---|---|---|
| KR | 10-2010-0082191 | 7/2010 |
| KR | 10-2012-0064585 | 6/2012 |
| TW | M433070 | 7/2012 |

* cited by examiner

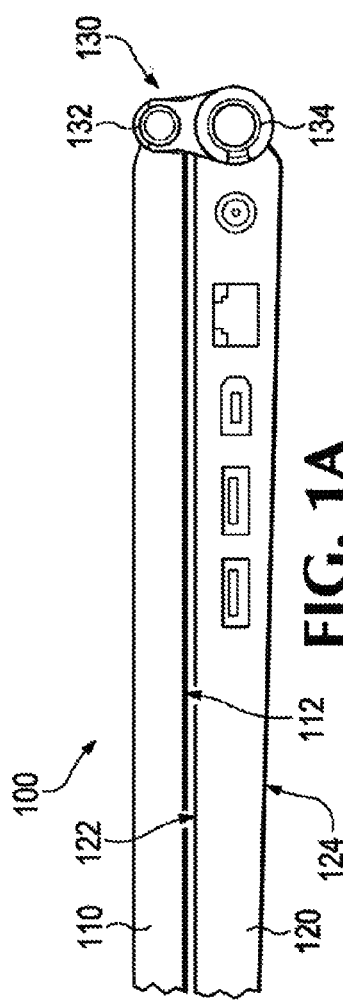
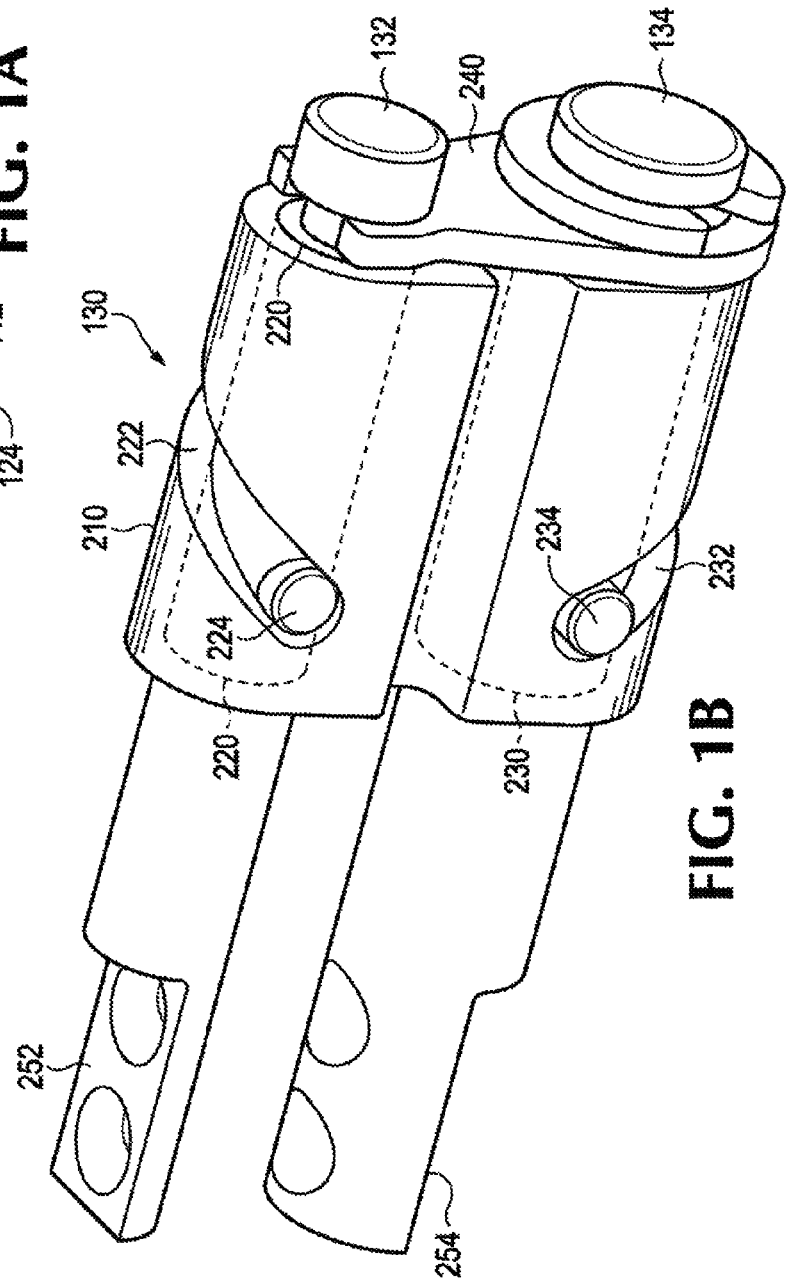

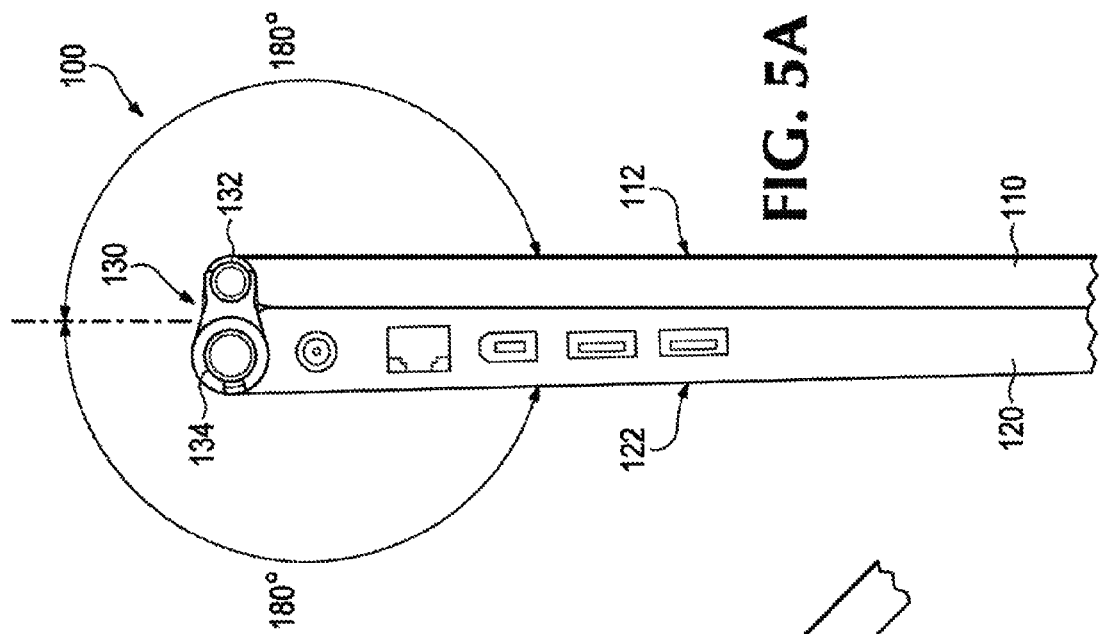
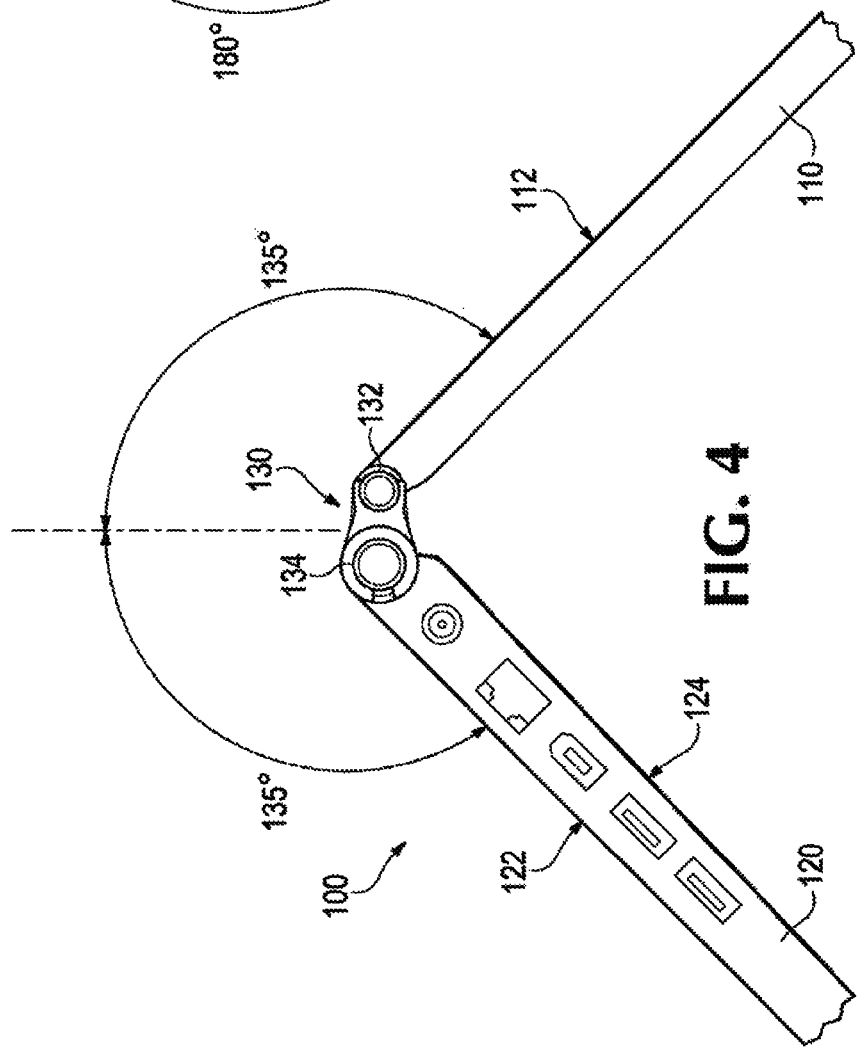

HINGE ASSEMBLY FOR A COMPUTING DEVICE

BACKGROUND

The emergence and popularity of mobile computing has made portable computing devices, due to their compact design and light weight, a staple in today's marketplace. Within the mobile computing realm, notebook computers, or laptops, are one of the most widely used devices and generally employ a clamshell-type design consisting of two housings connected together at a common end via one or more hinges, for example. In most cases, a first or display housing is utilized to provide a viewable display to a user while a second or base housing includes an area for user input (e.g., touchpad and keyboard).

BRIEF DESCRIPTION OF THE DRAWINGS

FIGS. 1A-B illustrate a laptop and a dual pivot point hinge in a closed, folded position, according to one example;

FIG. 4 illustrates another mode of a laptop, according to one example;

FIGS. 5A-B illustrate a laptop and a dual pivot point hinge in a tablet mode, according to one example.

DETAILED DESCRIPTION

Figure 2:
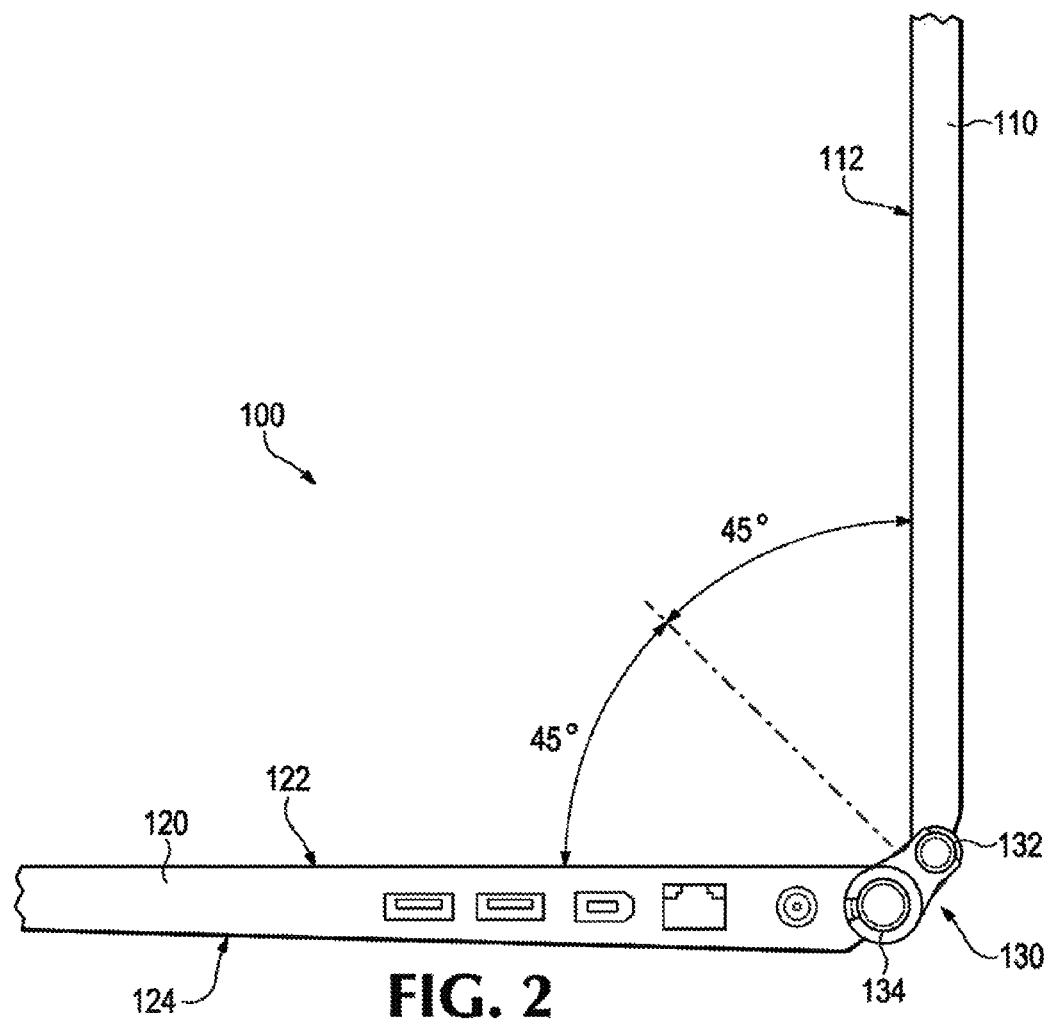
FIG. 2 illustrates a laptop in a mode where the touchpad and/or keyboard is used as input, according to one example.

Notebook computers may include a feature that allows the device to be "converted" from one style of use to another style of use. For example, a notebook computer may be converted from a laptop mode, where the touchpad and keyboard is used as input, to a tablet mode, where the display is used for both viewing and input. Such devices that serve this dual purpose may be called convertible laptops. Many form factors exist for convertible laptops. A common form factor includes hinges that allow the display housing to rotate 360 degrees relative to the base housing to operate the laptop in tablet mode. For example, from its closed position, where the laptop is closed and the display is not visible, the display housing may be rotated 360 degrees relative to the base housing to operate the display of the laptop as a tablet. As a result, the housings may be collapsed against each other in an open, folded position that is in a reverse orientation relative to the closed, folded position. In this open, folded position, the touchpad and keyboard of the base housing may be located at an exterior facing side and the display may be located at the opposite exterior facing side, viewable to a user.

A hinge with two pivot points, or a dual pivot point hinge, may allow for this open, folded position. One pivot point may allow for the display housing to rotate 180 degrees around a first axis relative to the hinge, and the other pivot point may allow for the base housing to rotate 180 degrees around a second axis relative to the hinge, totaling 360 degrees. A challenge faced by manufacturers of convertible laptops using the dual pivot point hinges is ensuring that the housings smoothly open and close and allow for a user to satisfactorily operate the laptop in its various modes (e.g., at least laptop mode and tablet mode). In addition, due to the ever-increasing drive to make laptops more compact and light weight, the size of the hinges, and the space they occupy, are factors that should be taken into consideration.

Examples disclosed herein provide dual pivot point hinges that allow for synchronized movement of the base housing and display housing as a computing device is transitioned between different modes, such as laptop mode and tablet mode. The size of the hinge may be minimal and, therefore, the space the hinge occupies can be appropriate for laptops that are becoming more compact and light weight. By allowing the housings of the laptop to rotate in unison with respect to the hinge, users of the laptop have a positive user experience while using the laptop in its various modes.

In one example, a hinge assembly for a computing device can have a first barrel coupled to a second barrel. The first barrel can have a first groove that extends circumferentially and longitudinally along at least a length of the first barrel, and the second barrel can have a second groove that extends circumferentially and longitudinally along at least a length of the second barrel. A first hinge pivot shaft may rotate about a first axis via the first barrel, and the first shaft may include a first guide pin to follow the first groove along the first barrel. A second hinge pivot shaft may rotate about a second axis via the second barrel, and the second shaft may include a second guide pin to follow the second groove along the second barrel. A bracket may align a point along a length of the first shaft with a point along a length of the second shaft.

In another example, a computing device can have a base housing, including a top surface and a bottom surface opposite the top surface, and a display housing coupled to the base housing by a hinge assembly. The hinge assembly can have a first barrel coupled to a second barrel. The first barrel can have a first groove that extends circumferentially and longitudinally along at least a length of the first barrel, and the second barrel can have a second groove that extends circumferentially and longitudinally along at least a length of the second barrel. A first hinge pivot shaft attached to the display housing may rotate about a first axis via the first barrel, and the first shaft may include a first guide pin to follow the first groove along the first barrel. A second hinge pivot shaft attached to the base housing may rotate about a second axis via the second barrel, and the second shaft may include a second guide pin to follow the second groove along the second barrel. A bracket may align a point along a length of the first shaft with a point along a length of the second shaft.

In yet another example, a hinge assembly for a computing device can have a first barrel coupled to a second barrel. The first barrel can have a first groove that wraps around the first barrel along at least a length of the first barrel, and the second barrel can have a second groove that wraps around the second barrel along at least a length of the second barrel. A first hinge pivot shaft may rotate about a first axis via the first barrel, and the first shaft may include a first guide pin to follow the first groove along the first barrel. A second hinge pivot shaft may rotate about a second axis via the second barrel, and the second shaft may include a second guide pin to follow the second groove along the second barrel. A bracket may align an end of the first shaft with an end of the second shaft.

With reference to the figures, FIG. 1A illustrates a laptop 100 in a closed, folded position, as an example. The laptop 100 includes a display housing 110 and a base housing 120 that is joined together via a hinge assembly that includes a dual pivot point hinge 130. Although it is not illustrated, the display housing 110 and the base housing 120 may be joined together via additional dual pivot point hinges 130. In addition, the hinges 130 may join the housings 110, 120 in areas besides the ends of the housings.

The dual pivot point hinge 130 includes a first hinge pivot shaft 132 and a second hinge pivot shaft 134. The first shaft 132 may be attached to the display housing 110, allowing the display housing 110 to rotate around a first axis via a first pivot point of the hinge 130. The second shaft 134 may be attached to the base housing 120, allowing the base housing 120 to rotate, via a second pivot point of the hinge 130, around a second axis that is substantially parallel to the first axis. The base housing 120 includes a top surface 122 and a bottom surface 124 that is opposite the top surface 122. As an example, the top surface 122 of the base housing 120 may include input means for operation by the user, such as a keyboard and/or a touchpad. The display housing 110 includes a display screen 112 for viewing the video output of the laptop 100. In addition, the display screen 112 may include input means for operation by the user, such as a touchscreen.

FIG. 1B provides an illustration of the hinge 130 as the laptop 100 is in a closed, folded position, as an example. The first hinge pivot shaft 132 may be attached to the display housing 110 at 252. Similarly, the second hinge pivot shaft 134 may be attached to the base housing 120 at 254. As an example, multiple dual pivot point hinges 130 may be used for coupling the housings 110, 120. The first hinge pivot shaft 132 may rotate via a first pivot point that includes a first barrel 220, and the second hinge pivot shaft 134 may rotate via the second pivot point that includes a second barrel 230. The first and second barrels 220, 230 may be coupled together as one piece, as illustrated by shuttle 210.

The first barrel 220 may include a groove 222 that extends circumferentially and longitudinally along at least a length of the first barrel 220. The first hinge pivot shaft 132 may include a guide pin 224 to follow the groove 222 along the first barrel 220. As a result, as the first shaft 132 rotates about the first axis via the first barrel 220, the guide pin 224 follows the groove 222. Similar to the first barrel 220, the second barrel 230 may include a groove 232 that extends circumferentially and longitudinally along at least a length of the second barrel 230. The second hinge pivot shaft 134 may include a guide pin 234 to follow the groove 232. As an example, the grooves 222, 232 may have a helix-like profile that wraps around the barrels along at least a length of the barrels, as illustrated. As the laptop is opened from a closed, folded position to an open, folded position, the pins 224, 234 may follow along from one end of the grooves to the other end of the grooves that are wrapped around the barrels. Upon reaching the ends of the grooves 222, 232, the pins may reach a hard stop.

For synchronizing the rotation of the hinge pivot shafts 132, 134 towards or away from each other, the dual pivot point hinge 130 may include a bracket 240 for aligning a point along a length of the first hinge pivot shaft 132 with a point along a length of the second hinge pivot shaft 134. As an example, the bracket 240 may align an end of the first shaft 132 with an end of the second shaft 134, as illustrated in FIG. 1B. When the first shaft 132 is rotated by a certain degree, causing the first guide pin 224 to follow along the first groove 222, the bracket 240 may keep the shafts 132, 134 aligned. As a result, the second guide pin 234 may follow along the second groove 232 by an amount that corresponds to the movement of the first guide pin 224, causing the second shaft 134 to rotate an amount that corresponds to the movement of the second guide pin 234. The shuttle 210, which includes the barrels 220, 230, may traverse a length of the first and second shafts 132, 134 as the first and second guide pins 224, 234 follow the grooves along the barrels. Therefore, the bracket 240 may synchronize rotation of the first and second shafts 132, 134 as the first and second guide pins 224, 234 follow the grooves along the barrels.

As an example, the first and second grooves 222, 232 may extend in opposite directions from each other, as illustrated, allowing for the shafts 132, 134 to rotate towards or away from each other. The groove along a barrel may determine the degree by which a shaft rotates. As an example, the greater the slope of the groove is along the barrel, the more the shaft may rotate as its guide pin follows along the groove. If the grooves 222, 232 have the same slope, but in opposite directions, as illustrated in FIG. 1B, the shafts 132, 134 may rotate towards or away from each other with the same degree of rotation (i.e., rotate in unison with respect to the hinge 130, or synchronized movement). However, if the grooves 222, 232 have different slopes or different patterns, the shafts 132, 134 may rotate towards or away from each other with differing degrees of rotation.

From its closed, folded position, the laptop 100 may be used in laptop mode, where the touchpad and/or keyboard is used as input, by adjusting the angle of the display housing 110 with respect to the base housing 120 so that the display screen 112 is at an appropriate viewing angle for a user. As illustrated in FIG. 2, the display housing 110 may form a 90 degree angle with respect to the base housing 120, which may be an appropriate angle for the user to operate the laptop 100 in laptop mode.

As the user opens the laptop from its closed, folded position, the dual pivot point hinge 130 may synchronize the rotation of both housings 110, 120, causing the display housing 110 and the base housing 120 to each open corresponding amounts away from each other. For example, as the user opens the laptop 100 from its closed, folded position by moving the display housing 110 away from the base housing 120 by a certain amount (45 degrees, as illustrated), the base housing 120 may open an equal amount via the hinge 130. Although FIG. 2 illustrates that the display housing 110 and base housing 120 are each opened 45 degrees from the closed, folded position (dashed line), the housings 110, 120 may open by differing amounts such as 30 degrees and 60 degrees, to reach the total opening angle totaling 90 degrees in the example of FIG. 2.

When a user operates a convertible laptop in its various modes, it is desirable for the laptop to feel sturdy and rigid. For example, when the user operates the laptop in laptop mode by setting the display housing at an appropriate viewing angle, it is not desirable for the display housing to fall forwards or backwards as the user operates the laptop. As another example, when the user operates the laptop in tablet mode, with the housings in an open, folded position, it is not desirable for the base housing to inadvertently flip open. In addition to the laptop being sturdy and rigid in its various modes, it is desirable for the housings to smoothly open and close as the user transitions the laptop between its various modes.

As an example, the interior diameters of the first and second barrels 220, 230 may substantially match the diameters of the first and second hinge pivot shafts 132, 134. As a result, the first and second barrels 220, 230 may function as a frictional element by providing rotational resistance as the first and second hinge pivot shafts 132, 134 rotate. The difference in diameter between a barrel and a shaft may determine the level of resistance that is present when rotating the shaft. By closely matching the diameters, a user may be able to smoothly open and close the housings, and the housings may remain fixed and rigid with respect to each other while in the various modes.

As an example, the diameters of the first and second hinge pivot shafts 132, 134 may vary along their length. As a result, the first and second barrels 220, 230 may provide varying amounts of rotational resistance as the hinge pivot shafts 132, 134 rotate to operate the laptop 100 in different modes. As an example, the first and second barrels 220, 230 may provide varying amounts of rotational resistance based on the diameters of the first and second hinge pivot shafts 132, 134 at a particular point along their length with respect to the interior diameters of the first and second barrels 220, 230. As the shuttle 210 traverses along a length of the shafts 132, 134, the diameters of the shafts 132, 134 at the entrance of each barrel 220, 230 may determine the amount of rotational resistance that is present for each housing 110, 120.

For example, for the range of angles that is appropriate for viewing the display of the laptop 100 in laptop mode, the diameters of the shafts 132, 134 at the entrance of the barrels 220, 230 may substantially match the interior diameters of the barrels 220, 230, allowing for the housings 110, 120 to remain fixed and rigid with respect to each other. When transitioning the laptop 100 from laptop mode to tablet mode, the relationship of the diameters may allow for the housings to rotate more freely, and then the rotational resistance may increase again when approaching the tablet mode, allowing for the housings 110, 120 to remain in an open, folded position.

Figure 3A:
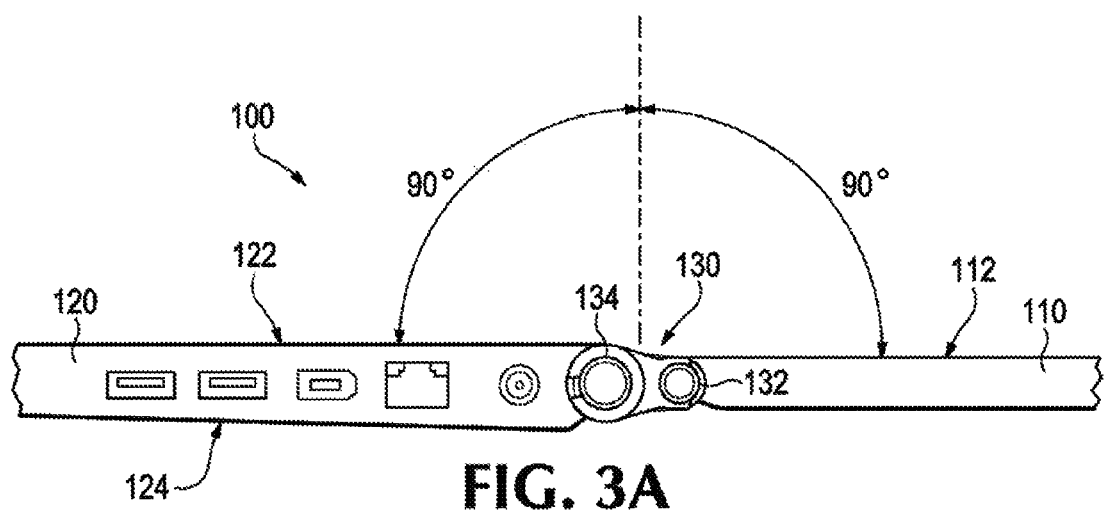
FIGS. 3A-B illustrate a laptop and a dual pivot point hinge in another mode, according to one example.
Figure 3B:
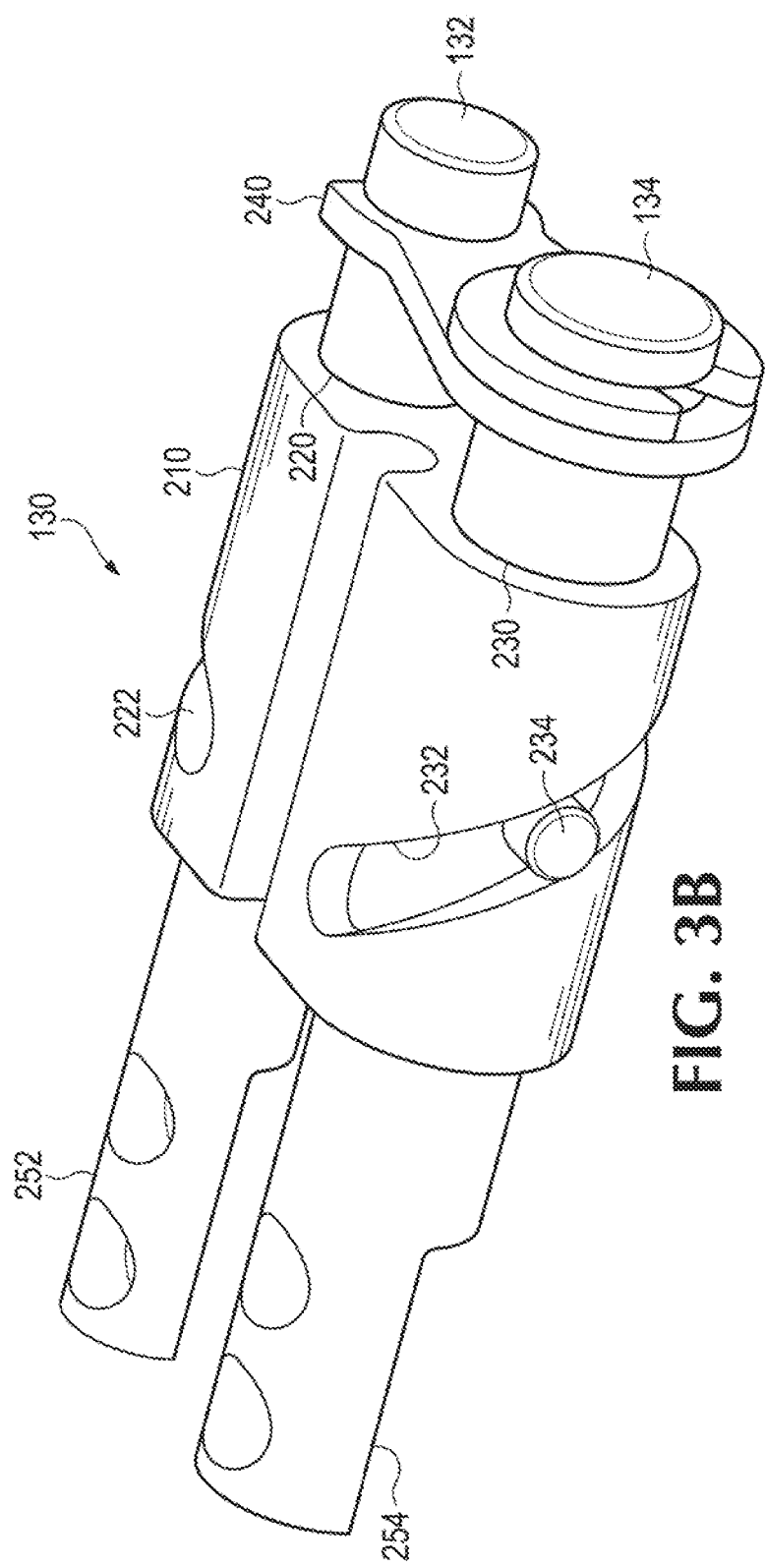

Referring to FIG. 3A, as the laptop 100 continues to be transitioned to tablet mode, the display housing 110 may form a 180 degree angle with respect to the base housing 120. If the grooves 222, 232 of the hinge 130 have the same slope, but in opposite directions, the housings 110, 120 may rotate away from each other with the same degree of rotation. As illustrated in FIG. 3A, the housings 110, 120 may each rotate 90 degrees away from each other. However, if the grooves 222, 232 have different slopes or different patterns, the housings 110, 120 may rotate away from each other with differing degrees of rotation (not shown). FIG. 3B provides an illustration of the hinge 130 as the laptop 100 is opened in the manner illustrated in FIG. 3A, as an example. As the guide pins 224, 234 follow the grooves along the barrels, the shuttle 210 traverses a length of the first and second shafts 132, 134, from what was initially illustrated in FIG. 1B when the laptop 100 was in a closed, folded position.

FIG. 4 illustrates another mode of the laptop 100, as an example. From the closed, folded position (dashed line), the display housing 110 and base housing 120 may each be opened 135 degrees away from each other. As described above, the diameters of the shafts 132, 134 may be substantially matched to the diameters of the barrels of the hinge 130, to allow for the laptop 100 to be properly operated in this mode. For example, the laptop 100, as illustrated in FIG. 4, may be placed on a surface, and remain in place due to the resistance provided between the barrels of the hinge 130 and the shafts 132, 134. Although FIG. 4 illustrates that the housings 110, 120 may each be opened 135 degrees away from each other, the housings 110, 120 may open by differing amounts to operate the laptop 100 in this mode. For example, the housings 110, 120 may open by amounts greater or less than 135 degrees.

FIG. 5A illustrates the laptop 100 in tablet mode, as an example. The housings 110, 120 may be collapsed against each other in an open, folded position that is in a reverse orientation relative to the closed, folded position illustrated in FIG. 1A. As a result, the base housing 120 is parallel or substantially parallel to the display housing 110, allowing a user to operate the laptop 100 in a tablet mode. In this open, folded position, the top surface 122 of the base housing 120 may be located at an exterior facing side and the display screen 112 of the display housing 110 may be located at the opposite exterior facing side, viewable to a user.

Figure 5B:
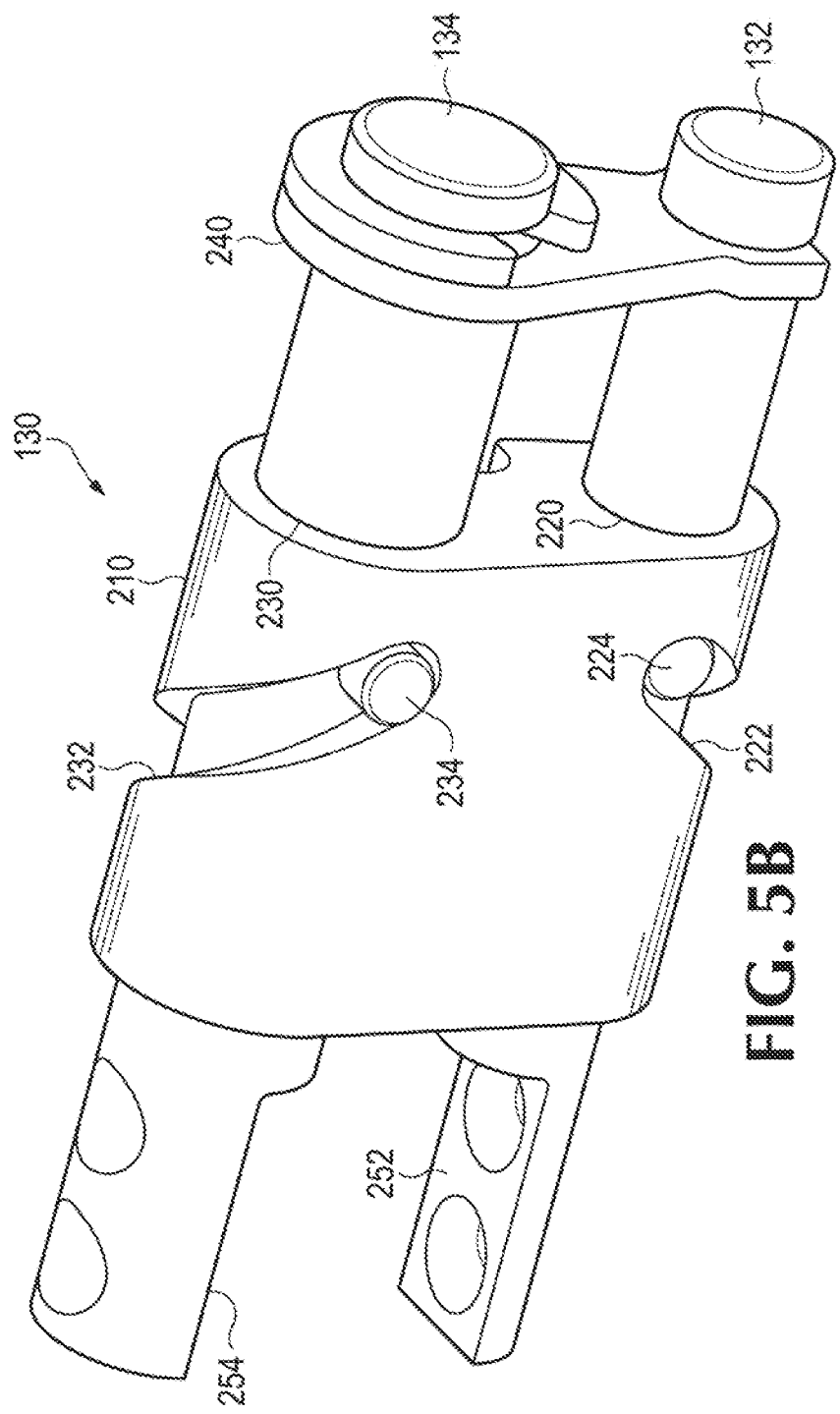

FIG. 5B provides an illustration of the hinge 130 of the laptop 100 in tablet mode, as an example. The guide pins 224, 234 may reach a hard stop upon reaching an end of the grooves wrapped around the barrels. If the grooves 222, 232 of the hinge 130 have the same slope, but in opposite directions, the first groove 222 may allow the display housing 110 to rotate 180 degrees in one direction and the second groove 232 may allow the base housing 120 to rotate 180 degrees in an opposite direction, as illustrated in FIG. 5A.

FIGS. 1B, 3B, and 5B illustrate how the shuttle 210 traverses a length of the first and second shafts 132, 134 as the laptop 100 is opened from its closed, folded position to tablet mode. As described above, as the pins 224, 234 follow the grooves along the barrels, the bracket 240 allows the shuttle 210 to traverse the length of the shafts 132, 134. By aligning the shafts 132, 134 with respect to each other, the bracket 240 may synchronize rotation of the first and second shafts 132, 134 as the first and second guide pins 224, 234 follow the grooves along the barrels.

It is appreciated that examples described herein below may include various components and features. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A hinge assembly for a computing device, comprising:
   a first barrel with a first groove that extends circumferentially and longitudinally along at least a length of the first barrel;
   a second barrel with a second groove that extends circumferentially and longitudinally along at least a length of the second barrel, wherein the second barrel is coupled to the first barrel;
   a first hinge pivot shaft to rotate about a first axis via the first barrel, wherein the first shaft includes a first guide pin to follow the first groove along the first barrel;

a second hinge pivot shaft to rotate about a second axis via the second barrel, wherein the second shaft includes a second guide pin to follow the second groove along the second barrel; and a bracket to align a point along a length of the first shaft with a point along a length of the second shaft.

2. The hinge assembly of claim 1, wherein the bracket is to synchronize rotation of the first and second shafts as the first and second guide pins follow the grooves along the barrels.

3. The hinge assembly of claim 2, wherein the barrels are to traverse a length of the first and second shafts as the first and second guide pins follow the grooves along the barrels.

4. The hinge assembly of claim 1, wherein the first hinge pivot shaft is to attach to a display housing of the computing device and the second hinge pivot shaft is to attach to a base housing of the computing device.

5. The hinge assembly of claim 4, wherein the first groove is to allow the display housing to rotate 180 degrees in one direction and the second groove is to allow the base housing to rotate 180 degrees in an opposite direction to enable the base housing to be substantially parallel to the display housing to operate the computing device in a tablet mode.

6. The hinge assembly of claim 1, wherein diameters of the first and second hinge pivot shafts vary along their length such that the first and second barrels are to provide varying amounts of rotational resistance as the hinge pivot shafts rotate to operate the computing device in different modes.

7. The hinge assembly of claim 6, wherein the first and second barrels are to provide varying amounts of rotational resistance based on the diameters of the first and second hinge pivot shafts at a particular point along their length with respect to diameters of the first and second barrels.

8. The hinge assembly of claim 1, wherein the first groove extends along at least the length of the first barrel in an opposite direction from the second groove extending along at least the length of the second barrel.

9. A computing device, comprising:
   a base housing including a top surface and a bottom surface opposite the top surface;
   a display housing coupled to the base housing by a hinge assembly comprising:
      a first barrel with a first groove that extends circumferentially and longitudinally along at least a length of the first barrel;
      a second barrel with a second groove that extends circumferentially and longitudinally along at least a length of the second barrel, wherein the second barrel is coupled to the first barrel;
      a first hinge pivot shaft attached to the display housing to rotate about a first axis via the first barrel, wherein the first shaft includes a first guide pin to follow the first groove along the first barrel;
      a second hinge pivot shaft attached to the base housing to rotate about a second axis via the second barrel, wherein the second shaft includes a second guide pin to follow the second groove along the second barrel; and
      a bracket to align a point along a length of the first shaft with a point along a length of the second shaft.

10. The computing device of claim 9, wherein the first groove is to allow the display housing to rotate 180 degrees in one direction and the second groove is to allow the base housing to rotate 180 degrees in an opposite direction to enable the base housing to be substantially parallel to the display housing to operate the computing device in a tablet mode.

11. The computing device of claim 10, wherein computing device can be operated in a tablet mode by rotating the display housing to cover the bottom surface of the base housing.

12. The computing device of claim 9, wherein the base housing and the display housing are to rotate in unison with respect to the hinge assembly as the first and second guide pins follow the grooves along the barrels.

13. The computing device of claim 12, wherein the barrels are to traverse a length of the first and second shafts as the first and second guide pins follow the grooves along the barrels.

14. A hinge assembly for a computing device, comprising:
   a first barrel with a first groove that wraps around the first barrel along at least a length of the first barrel;
   a second barrel with a second groove that wraps around the second barrel along at least a length of the second barrel, wherein the second barrel is coupled to the first barrel;
   a first hinge pivot shaft to rotate about a first axis via the first barrel, wherein the first shaft includes a first guide pin to follow the first groove along the first barrel;
   a second hinge pivot shaft to rotate about a second axis via the second barrel, wherein the second shaft includes a second guide pin to follow the second groove along the second barrel; and
   a bracket to align an end of the first shaft with an end of the second shaft.

15. The hinge assembly of claim 14, wherein the bracket is to synchronize rotation of the first and second shafts as the first and second guide pins follow the grooves along the barrels.

\* \* \* \* \*